United States Patent
Wu et al.

(10) Patent No.: US 10,136,146 B1
(45) Date of Patent: Nov. 20, 2018

(54) METADATA OPTIMIZATIONS FOR ENCODING OF MEDIA CONTENT

(71) Applicant: Amazon Technologies, Inc., Seattle, WA (US)

(72) Inventors: Yongjun Wu, Bellevue, WA (US); Lei Li, Kirkland, WA (US); Amarsingh Buckthasingh Winston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 15/078,898

(22) Filed: Mar. 23, 2016

(51) Int. Cl.
*H04N 19/33* (2014.01)
*H04N 19/70* (2014.01)
*H04N 19/48* (2014.01)
*H04N 19/91* (2014.01)
*H04N 21/2662* (2011.01)
*H04N 19/115* (2014.01)
*H04N 19/46* (2014.01)

(52) U.S. Cl.
CPC .......... *H04N 19/33* (2014.11); *H04N 19/115* (2014.11); *H04N 19/46* (2014.11); *H04N 19/48* (2014.11); *H04N 19/70* (2014.11); *H04N 19/91* (2014.11); *H04N 21/2662* (2013.01)

(58) Field of Classification Search
CPC ...... H04N 19/33; H04N 19/115; H04N 19/46; H04N 19/48
See application file for complete search history.

(56) References Cited

U.S. PATENT DOCUMENTS

| 6,223,183 | B1 * | 4/2001 | Smith | G06F 17/30017 |
| 2006/0050782 | A1 * | 3/2006 | Takeda | H04N 21/23406 375/240.01 |
| 2016/0191931 | A1 * | 6/2016 | Hannuksela | H04N 19/105 375/240.12 |
| 2016/0295257 | A1 * | 10/2016 | Iguchi | H04N 5/38 |

OTHER PUBLICATIONS

ISO/IEC; 14496012 Information technology—Coding of audio-visual objects; ISO/IEC, 3rd Edition; pp. 1-120 (Year: 2008).*
Hughes et al., "ISO/IEC 23001-7 3nd Edition—Common encryption in ISO base media file format files," Editor 23001-7, Oct. 2014, 33 Pages.
"Information technology—Coding of audio-visual objects: Part 12: ISO base media file format," International Standard, ISO/IEC 14496-12, Corrected Version Oct. 1, 2005, 94 pages.
"Information technology—Coding of audio-visual objects: Part 14: MP4 file format," International Standard, ISO/IEC 14496-14, First Version Nov. 15, 2003, 18 pages.

(Continued)

*Primary Examiner* — Peter D Le
(74) *Attorney, Agent, or Firm* — Weaver Austin Villeneuve & Sampson LLP

(57) ABSTRACT

Techniques for encoding media content are described that reduce the overhead associated with metadata when the encoded content is streamed over a network. Some of these techniques involve the selection of parameters or consolidation of information to ensure consistency or uniformity of metadata values. Others relate to the recognition and removal of redundancies or optional information. Still others take advantage of characteristics of specific bit rate scenarios to more efficiently represent information.

19 Claims, 4 Drawing Sheets

(56) References Cited

OTHER PUBLICATIONS

"Information technology—MPEG systems technologies—Part 7: Common encryption in ISO base media file format files," International Standard, ISO/IEC FDIS 23001-7:2014(E), Jul. 11, 2011, 6 pages.

Microsoft, "DASH Content Protection using Microsoft PlayReady," Version 1.2, Oct. 8, 2014.

Singer et al., "Proposed Common Media Format for Segmented Media," ISO/IEC JTC1/SC29/WG11, Feb. 2011, 70 Pages.

Kolarov et al., "Proposed Requirements for the Common Media Format for Segmented Media," ISO/IEC JTC1/SC29/WG11, Feb. 2011, 4 Pages.

Bocharov, et al., "Portable encoding of audio-video objects: The Protected Interoperable File Format (PIFF)," Microsoft Corp, Revised Mar. 9, 2010, 32 Pages.

Apple Inc., "QuickTime File Format," Specification, Mar. 1, 2001, 274 pages.

\* cited by examiner

| | | | | | | | Box types, structure, and cross-reference | |
|---|---|---|---|---|---|---|---|---|
| ftyp | | | | | | | 4.3 | file type and compatibility |
| pdin | | | | | | | 8.43 | progressive download information |
| moov | | | | | | | 8.1 | container for all the metadata |
| | mvhd | | | | | * | 8.3 | movie header, overall declarations |
| | trak | | | | | * | 8.4 | container for an individual track or stream |
| | | tkhd | | | | * | 8.5 | track header, overall information about the track |
| | | tref | | | | | 8.6 | track reference container |
| | | edts | | | | | 8.25 | edit list container |
| | | | elst | | | | 8.26 | an edit list |
| | | mdia | | | | * | 8.7 | container for the media information in a track |
| | | | mdhd | | | * | 8.8 | media header, overall information about the media |
| | | | hdlr | | | * | 8.9 | handler, declares the media (handler) type |
| | | | minf | | | * | 8.10 | media information container |
| | | | | vmhd | | | 8.11.2 | video media header, overall information (video track only) |
| | | | | smhd | | | 8.11.3 | sound media header, overall information (sound track only) |
| | | | | hmhd | | | 8.11.4 | hint media header, overall information (hint track only) |
| | | | | nmhd | | | 8.11.5 | Null media header, overall information (some tracks only) |
| | | | | dinf | | * | 8.12 | data information box, container |
| | | | | | dref | * | 8.13 | data reference box, declares source(s) of media data in track |
| | | | | stbl | | * | 8.14 | sample table box, container for the time/space map |
| | | | | | stsd | * | 8.16 | sample descriptions (codec types, initialization etc.) |
| | | | | | stts | * | 8.15.2 | (decoding) time-to-sample |
| | | | | | ctts | | 8.15.3 | (composition) time to sample |
| | | | | | stsc | * | 8.18 | sample-to-chunk, partial data-offset information |
| | | | | | stsz | | 8.17.2 | sample sizes (framing) |
| | | | | | stz2 | | 8.17.3 | compact sample sizes (framing) |
| | | | | | stco | * | 8.19 | chunk offset, partial data-offset information |
| | | | | | co64 | | 8.19 | 64-bit chunk offset |
| | | | | | stss | | 8.20 | sync sample table (random access points) |
| | | | | | stsh | | 8.21 | shadow sync sample table |
| | | | | | padb | | 8.23 | sample padding bits |
| | | | | | stdp | | 8.22 | sample degradation priority |
| | | | | | sdtp | | 8.40.2 | independent and disposable samples |
| | | | | | sbgp | | 8.40.3.2 | sample-to-group |
| | | | | | sgpd | | 8.40.3.3 | sample group description |
| | | | | | subs | | 8.42 | sub-sample information |
| | mvex | | | | | | 8.29 | movie extends box |
| | | mehd | | | | | 8.30 | movie extends header box |
| | | trex | | | | * | 8.31 | track extends defaults |
| | ipmc | | | | | | 8.45.4 | IPMP Control Box |
| moof | | | | | | | 8.32 | movie fragment |
| | mfhd | | | | | * | 8.33 | movie fragment header |
| | traf | | | | | | 8.34 | track fragment |
| | | tfhd | | | | * | 8.35 | track fragment header |
| | | trun | | | | | 8.36 | track fragment run |
| | | sdtp | | | | | 8.40.2 | independent and disposable samples |
| | | sbgp | | | | | 8.40.3.2 | sample-to-group |

*FIG. 3*

METADATA OPTIMIZATIONS FOR ENCODING OF MEDIA CONTENT

BACKGROUND

MPEG-4 Part 14 or MP4 is a digital multimedia container format widely used for storing video and audio content. Like many container formats, MP4 allows streaming of the encoded media over the Internet. The typical MP4 file includes a hierarchy of objects referred to as "boxes" representing different components of the file including one or more video tracks and one or more audio tracks. Each of the boxes in the MP4 file hierarchy has associated metadata representing various parameters for the box and possibly other boxes within that box. When an MP4 file is streamed over the Internet, these metadata typically consume 10-15 kbps of the available bandwidth. This overhead can be problematic, particularly for lower bit rate scenarios.

BRIEF DESCRIPTION OF THE DRAWINGS

FIG. 3 is a table illustrating a portion of the hierarchy of an ISO Base Media file.

DETAILED DESCRIPTION

This disclosure describes a variety of techniques for encoding media content in ways that reduce the overhead associated with metadata when the encoded content is streamed over a network. Some of these techniques involve the selection of parameters or consolidation of information to ensure consistency or uniformity of metadata values. Others relate to the recognition and removal of redundancies or optional information. Still others take advantage of characteristics of specific bit rate scenarios to more efficiently represent information. As will be appreciated and depending on the particular application, these techniques may be used in various combinations to reduce metadata overhead. An example may be instructive.

In an MP4 file, a sample typically represents an individual frame of video. The default metadata field specified by the MP4 specification for representing the size of the image in the frame of video is a 4-byte field which allows for representation of an image size of up to 4 gigabytes. However, for lower bit rate scenarios (e.g., 500 kbps or below) most of this range is unused and therefore represents wasted overhead. That is, for bit rates below 500 kpbs, images in the frames of video are typically not larger than 64 kilobytes in size and can therefore be represented in the metadata with a 2-byte field. So, while a high-definition (HD) version of a video might require 4-bytes to represent the size of its frame images, a lower resolution version of the same video may be encoded using only 2 bytes to represent the same parameter, resulting in a savings of 16 bits per sample. For a frame rate of 24 frames per second, this represents a savings of 384 bits per second relative to the higher resolution version. And as will be discussed, by accumulating the savings associated with the use of multiple techniques described herein, significant reductions in metadata overhead may be realized.

Figure 1:
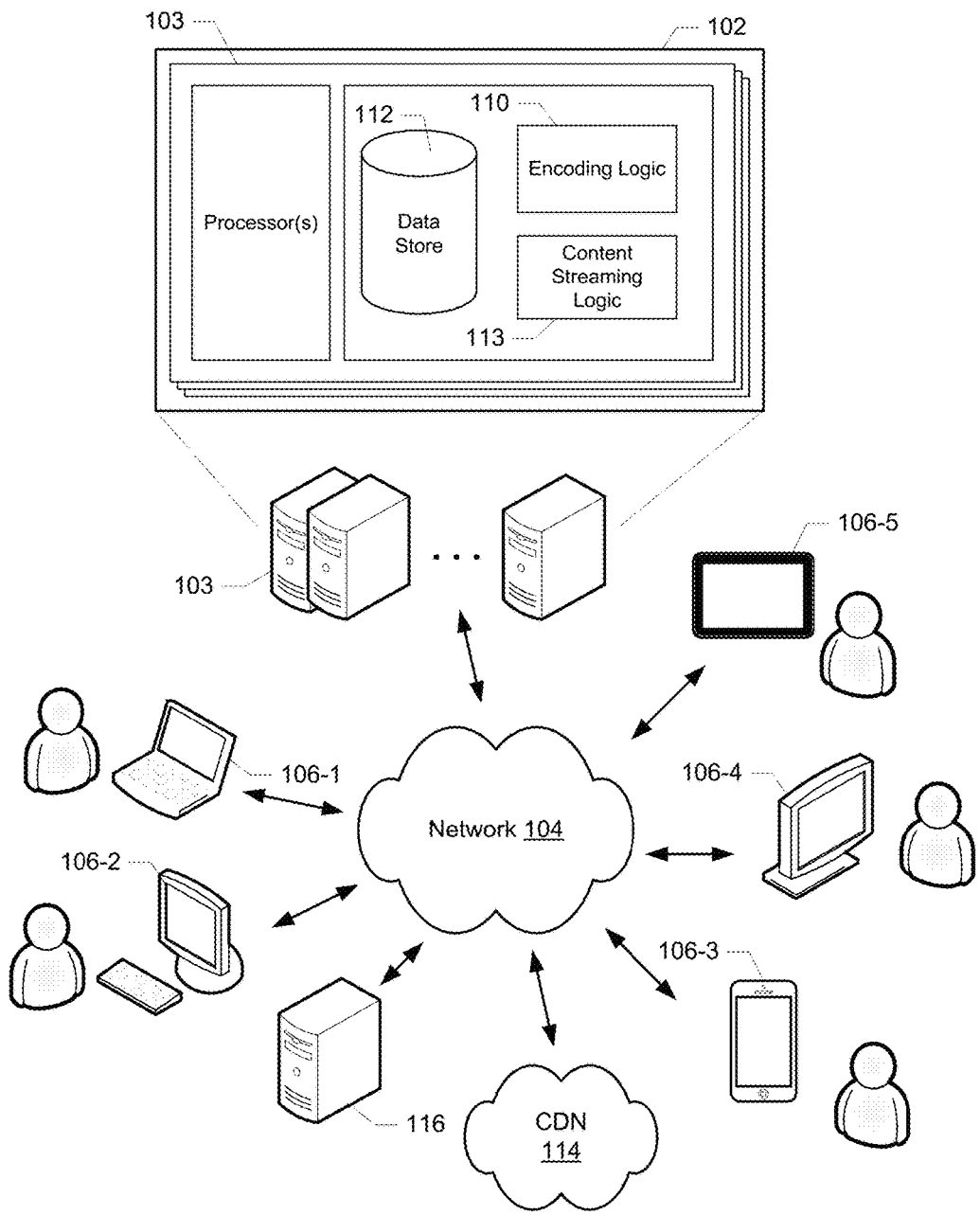
FIG. 1 is a simplified diagram of a computing environment in which various implementations enabled by the present disclosure may be practiced.

FIG. 1 illustrates an example of a computing environment in which a video content service 102 encodes content and provides the encoded content as streaming content (e.g., audio or video) via network 104 to a variety of client devices (106-1 through 106-5) in accordance with the techniques described herein. Content service 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 106 may be any suitable device capable of connecting to network 104 and consuming streaming content provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 102. Alternatively, such resources may be independent of content service 102, e.g., on a platform under control of a separate provider of computing resources with which content service 102 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols, encoding techniques, or DRM systems herein are merely by way of example. Suitable alternatives known to those of skill in the art may be employed.

In the following examples and for the sake of simplicity, content service 102 is described as if it were integrated with the platform(s) that encodes content (e.g., encoding logic 110), stores encoded content (e.g., data store 112), and provides the streaming content to client devices (content streaming logic 113). Alternatively, content service 102 may provide access to streaming content in conjunction with one or more content delivery networks (e.g., CDN 114) that may or may not be independent of content service 102. Content service 102 might also receive the encoded content from another platform or entity that may or may not be independent of content service 102. The encoded content itself may also be stored on platforms (e.g., server 116) that may or may not be independent of content service 102. The range of variations known to those of skill in the art are contemplated to be within the scope of this disclosure.

In addition to providing access to the streaming content, content service 102 may also store the encoded content itself, as well as a variety of information related to the streaming content (e.g., manifest data) in data store 112 to which service 102 provides access. Alternatively, such information about the streaming content, as well as the streaming content itself may be provided and/or hosted by one or more separate platforms, e.g., CDN 114. It should be noted that, while encoding logic 110 and data store 112 are contemplated as integrated with content service 102, implementations are contemplated in which either or both operate remotely from the associated content service, and/or either or both are under the control of an independent entity. From these examples, those of skill in the art will understand the diversity of use cases to which the techniques described herein are applicable.

Some examples described herein assume the use of Dynamic Adaptive Streaming over HTTP (MPEG-DASH) of content stored in the MP4 format including metadata optimizations enabled by the present disclosure. However, it will be understood that the basic principles described herein may be employed with any of a variety of file formats and video streaming codecs. For example, another container format which may benefit from metadata optimizations similar to those described herein is the MPEG-2 transport stream file format. This file format may be streamed using MPEG-DASH, but may also be streamed using Apple's HTTP Live Streaming (HLS). Examples of other container formats are discussed below. The scope of the present disclosure should therefore not be limited with reference to the specific examples described herein.

To support access to video content by different device types over multiple channels, multiple versions of the video content are encoded at different quality levels that correspond to different display resolutions and which are streamed at different bit rates. For example, different versions of the same video content might correspond to display resolutions of 8K UHD, 4K UHD, 1440p, 1080p, 1080i, 720p, 576i, 480i, etc. According to some implementations, each of the versions is encoded using the MP4 format in which a file is formed as a hierarchy of objects referred to as boxes.

A typical MP4 file (often referred to as corresponding to a "presentation") includes a media data box and a movie box at the highest level of its hierarchy. The media data box holds the actual content data for the presentation. The movie box includes a hierarchy of sub-boxes that define the metadata for the presentation. These typically include a track box for each type of media included in the presentation, e.g., video, audio, subtitles, etc. Each track box corresponds to a collection of content samples (e.g., frames of video or durations of audio) and "chunks" or contiguous sets of samples (also referred to as "fragments"), and includes its own hierarchy of boxes that defines metadata down to the chunk and the individual sample. These metadata enable a great deal of customization in how content is encoded. For additional information regarding the MP4 format, please refer to ISO/IEC 14496 Parts 12 and 14.

Figure 2:
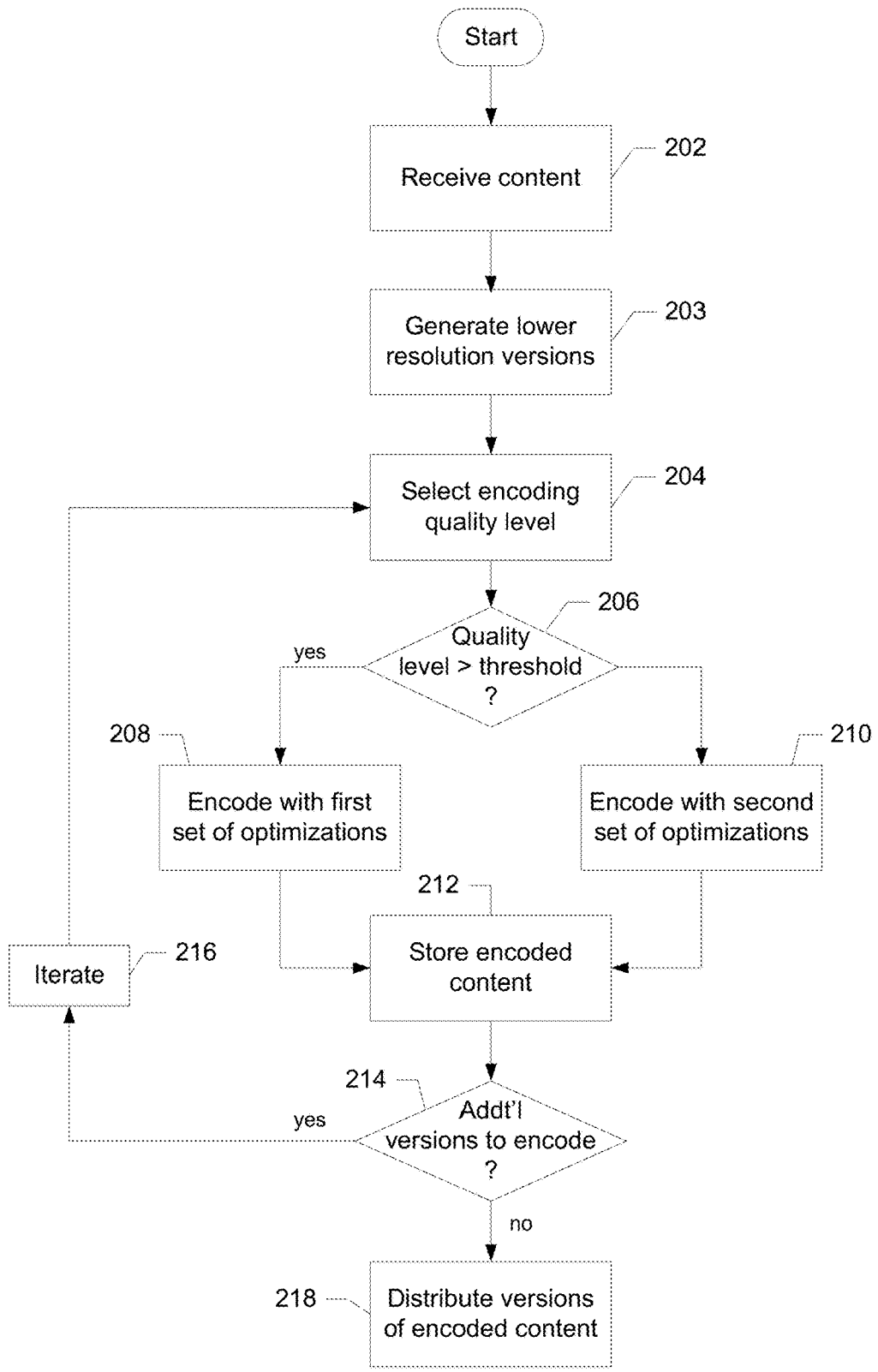
FIG. 2 is a flowchart illustrating operation of a particular implementation.

Conventionally, a large amount of metadata is transmitted along with each sample as the video content is being streamed over a network. According to various implementations enabled by the present disclosure, content is encoded using a number of optimizations in the way metadata are specified such that the consumption of network bandwidth by the metadata is reduced; the reduction(s) being particularly significant for low bit rate scenarios. Referring now to FIG. 2, content in its native format is received by encoding logic (202), e.g., logic 110 of FIG. 1, for encoding in the MP4 format as multiple versions at different quality levels. The received content is typically a very high resolution version of the content. Before encoding begins, multiple lower resolution versions of the content are generated that will be used as the basis for encoding the different MP4 versions of the content (203). The encoding logic determines the quality level (e.g., resolution or bit rate) at which the current version of the content is to be encoded (204). If the quality level is above a threshold (206), the content may be encoded in the MP4 format using a first set of metadata optimizations (208). That is, implementations are contemplated in which some metadata optimizations may only apply to some versions of the encoded content. For example, as discussed above, high resolution versions of the content would not be able to represent image size with a 2-byte field and so would not be able to use that optimization. Thus, some implementations may have different sets of optimizations that are applied to different subsets of the different versions of the content. Implementations are also contemplated in which some versions of the content, e.g., the highest resolution versions, may not include any of the optimizations described herein.

Referring again to FIG. 2, if the current version of the content is to be encoded at a quality level below the threshold (206), an MP4 encoding scheme is employed in which a second set of metadata optimizations is used (210). As will become apparent, various combinations of these optimizations can result in a significant reduction in the streaming overhead represented by metadata, particularly for lower bit rate scenarios. It should be noted not all of the optimizations described herein need be applied, and that various different combinations of optimizations are contemplated.

The quality threshold that determines the set of metadata optimizations may vary over a range. For example, the threshold may relate to the image or display resolution for which the content version is being encoded. Alternatively, the threshold may relate to the bit rate or bit rate range at which the content version is to be streamed. As yet another alternative, the threshold may relate to a measure of network bandwidth required to stream a particular content version. According to a particular implementation, the threshold is expressed in terms of the image resolution of the content or the display resolution of the displays for which the content is intended, and a particular set of metadata optimizations is applied to the versions at or below the resolution of Standard Definition (SD) video (e.g., 576i or 480i), while another set of metadata optimizations (or potentially no optimizations) is applied above this threshold.

Referring again to FIG. 2, the encoded version of the content is stored (212), and the process iterates for each version of the content being encoded (214) and (216). Once all of the versions of the content have been encoded, the set of versions are distributed (e.g., provided to CDNs) for streaming to client devices (218). This might involve, for example, transmission of copies of some or all of the encoded versions of the content to one or more content distribution networks (CDNs) to which client devices connect to consume the content. As mentioned above, different versions might include different subsets of metadata optimizations. Specific examples of metadata optimizations that may be employed by various implementations will now be described.

A first optimization relates to the selection of the timescale for a presentation so that the duration of samples is uniform. Timing in an MP4 file can be understood by reference to a number of structures. The presentation of a file (and each track) has a corresponding timescale. The timescale is an integer that specifies the number of time units in one second, and is a parameter that defines other time-related parameters. For example, a time coordinate system that measures time in sixtieths of a second has a time scale of 60. For video, a timescale of 24000 and media sample durations of 1001 exactly define NTSC 24p video (e.g., 23.976 frames per second). As will be discussed, selection of the wrong timescale for a presentation can result in inefficiencies.

For example, timescale=90000 is not a good choice for a frame rate of 23.976 frames per second. Inverting the frame rate (1/23.976 fps) yields a frame or sample duration of 0.0417083750417083750417083750417083504171 seconds. This may be converted to the sample duration in terms of the timescale by: $0.0417083750417083750417083750417083504171 \times 90000 = 3753.75375375375375375375375375375375537538$. However, according to the MP4 spec, the sample duration must be an integer. The sample duration must therefore be truncated (to 3753) with the remainder being accumulated into the last sample of the 48 samples of a 2-second fragment, resulting in the last sample having a different duration as determined by: $0.75375375375375375375375375375375537538 \times 48$ $(36)+3753=3789$. As will be appreciated, fragments of variable length may not be tolerated by some media players or browsers.

In addition, for situations in which variable length fragments are tolerated, because the sample duration is not consistent over the presentation, it must be specified for every sample with a custom duration, consuming 8 bytes per sample. This results in streaming overhead of 1.5 kbps, i.e., (8 bytes/sample)×(8 bits/byte)×(24 samples/s); a significant overhead for low bit rate scenarios.

According to this first optimization, the timescale for a presentation is chosen such that the sample duration is an integer and is consistent across samples. And because the sample duration is the same for the presentation, it does not need to be specified or transmitted on a per sample basis, significantly reducing the streaming overhead associated with this kind of metadata. That is, this information can be specified at a higher level of the file hierarchy (e.g., at the fragment level) rather than as a custom value for each sample.

One approach to determining an appropriate value for the timescale involves representing the frame rate as a ratio of integers, and choosing the timescale based on the numerator and the sample duration based on the denominator. For example, the frame rate of 23.976 fps may be represented as 24000/1001, the frame rate of 29.97 fps as 30000/1001, and the frame rate of 30 fps as 30000/1000. The time scale for the corresponding presentations may then be defined as 24000, 30000, and 30000, respectively (or integer multiples thereof), with the sample durations then being a consistent 1001, 1001, and 1000, respectively (or integer multiples thereof).

Two related optimizations reduce metadata overhead relating to content encryption. Conventionally, different lengths (in terms of bytes) of data in a sample are labeled either "clear" or "encrypted." This "subsample encryption" is specified in the sample encryption (senc) box for a sample and is conventionally specified for each clear or encrypted byte range. According to this optimization, the clear and encrypted data are consolidated so that only one subsample mapping entry for each is required per sample. This reduces the overall number of subsample mapping entries per fragment. In addition, the parameter sample_info_size (which specifies the size of the subsample mapping entries may be made consistent across samples within a chunk or fragment by using a fixed-length field that is sufficiently large to handle the largest subsample mapping entry. This information therefore does not need to be specified for each sample in the sample auxiliary information sizes (saiz) box. Instead, sample_info_size may be specified once at the fragment or chunk level. This may save an additional 2 bytes per sample.

A third optimization relates to network abstraction layer units (NALUs). The network abstraction layer (NAL) is part of the H.264 and HEVC video coding standards, providing a layer of abstraction to encoded video to facilitate delivery of the video over a variety of transport layers. This "network friendly" representation of the encoded video enables flexibility in the types of applications by which the video can be delivered. An access unit delimiter (AUD) is a type of NALU used to delimit frames. For some video streaming applications in which a certain amount of content is buffered, the AUD is not particularly useful and so may be omitted, saving 6 bytes per sample.

A fourth optimization also relating to the network abstraction layer involves the reduction in size of at least some types of NALUs. For example, the sequence parameter set (SPS) NALU includes information required for configuration of a decoder such as profile, level, resolution, and frame rate. The picture parameter set (PPS) NALU includes information on entropy coding mode, slice groups, motion prediction, and deblocking filters. In some applications it is necessary to "stuff" NALUs with trailing zeroes to fill in the 32-bit width of the field. However, this is not necessary in some streaming scenarios. So, by stripping these zeroes out during the encoding process, additional streaming overhead may be saved. This may be done with "slice" NALUs as well.

A fifth optimization, mentioned above, relates to the size of the metadata field used to represent the size of the image in a frame of video. The default metadata field specified by the MP4 specification for representing the size of the image in the frame of video is a 4-byte field (e.g., in the "mov" box of the file) which allows for representation of an image size of up to 4 gigabytes. However, for lower bit rate scenarios most of this range is unused and therefore represents wasted overhead. For example, for bit rates below 500 kpbs, images in the frames of video are typically not larger than 64 kilobytes in size and can therefore be represented in the metadata with a 2-byte field. So, lower quality versions of the content are encoded using only 2 bytes to represent this parameter; a savings of 16 bits per sample. For a frame rate of 24 frames per second, this represents a savings of 384 bits per second.

A sixth optimization relates to the omission of optional parameters. For example, for tracks protected using the Common Encryption (CENC) scheme, the default value for aux_info_type is equal to 'cenc' and the default value for aux_info_type_parameter is 0 so content may be created omitting these optional fields. Therefore, these parameters can be specified once at the presentation level and then not at track, chunk, or sample level.

According to implementations in which metadata optimizations relate to the MP4 format, various combinations of these optimizations have resulted in reductions in the streaming overhead associated with the metadata of as much as 10-13 kbps. And as will be appreciated by those of skill in the art, various combinations and variations of the optimizations described herein may be employed to realize reductions in streaming overhead in any of a variety of container formats for video and audio content including, for example, container formats similar to or based on the ISO Base Media File Format (e.g., as described in ISO/IEC 14496 Part 12).

For example, the QuickTime File Format (QTFF) developed by Apple (also referred to as the .MOV format) is a container format that has similarities to the MP4 format and other container formats based on the ISO Base Media File Format. Like MP4 files, QTFF files are hierarchical in nature and include atoms (equivalent to boxes), tracks, chunks, samples, etc., that are similar to the corresponding data structures in the MP4 format. Given the similarities between MP4 and QTFF, it will be appreciated that several of the optimizations described above may be applied in the context of a QTFF file.

For example, appropriate selection of the timescale for a movie in a QTFF file may result in a uniform sample duration. And because the sample duration is uniform, it does not need to be specified or transmitted on a per sample basis, significantly reducing the streaming overhead associated with this kind of metadata.

In another example, the number of subsample mapping entries per chunk in a QTFF file can be reduced as described above by consolidating the clear and encrypted data in a sample. In addition, by making the size of the subsample mapping entries consistent across samples within a chunk, further reduction in streaming overhead can be realized as discussed above.

In another example, the sample size for samples in a QTFF file may be specified with fewer than the 32 bits called for in the QuickTime specification for lower bit rate scenarios.

NALU-related optimizations may also be applicable to QTFF files such as, for example, omitting some types of NALUs (e.g., AUDs), or reducing the size of some types of NALUs by removing trailing zeroes as discussed above. In addition, as with the MP4 format, metadata representing optional parameters may be omitted entirely.

The Protected Interoperable File Format (PIFF) developed by Microsoft (also referred to as the Smooth Streaming format) is another container format that has similarities to the MP4 format and other container formats based on the ISO Base Media File Format. PIFF files are also hierarchical in nature and include boxes (also referred to as "atoms"), tracks, chunks, samples, etc., that are similar to the MP4 format. Given the similarities between MP4 and PIFF, several of the optimizations described above may be applied in the context of a PIFF file.

As with MP4 and QTFF files, appropriate selection of the timescale for a presentation or movie in a PIFF file may result in a uniform sample duration with the result that the sample duration need not be specified or transmitted on a per sample basis.

Similarly, the number of subsample mapping entries per chunk in a PIFF file can be reduced by consolidating the clear and encrypted data in a sample. In addition, further reduction can be realized by making the size of the subsample mapping entries consistent across samples within a chunk.

In another example, the sample size for samples in a PIFF file may be specified with fewer bits for lower bit rate scenarios.

NALU-related optimizations may also be applicable to PIFF files such as, for example, omitting some types of NALUs (e.g., AUDs), or reducing the size of some types of NALUs by removing trailing zeroes as discussed above. In addition, as with the MP4 and QTFF formats, metadata representing optional parameters may be omitted.

Other container formats that have been developed more recently or are currently in development may also benefit from at least some of the metadata optimizations described herein. These include, for example, the Common File Format (CFF) employed by UltraViolet (a cloud-based digital rights locker), and the Common Media Format (CMF) currently in development by the Common Media Format Working Group of the International Organization for Standardization, Coding of Moving Pictures and Audio, and described in the working draft entitled *Proposed Common Media Format for Delivery of Segment Media*, ISO/IEC JTC1/SC29/WG11 MPEG2016/M37755 (February 2016), and the working draft entitled *Proposed Requirements for the Common Media Format for Segmented Media*, ISO/IEC JTC1/SC29/WG11 MPEG2016/M37756 (February 2016), the entire disclosure of each of which is incorporated herein by reference for all purposes. Container formats yet to be developed but similar to or based on the ISO Base Media File Format may also realize the benefits of metadata optimizations as enabled by the present disclosure.

The CMF has been proposed to deal with the fact that, while a number of organizations have employed the core coding, file format, and system standards of MPEG, each has developed its own specification for the container file format for video content, resulting in both unnecessary duplication of engineering effort, and duplication of identical content in slightly different formats. And because the proposed format is an extension of the ISO Base Media File Format described in ISO/IEC 14496 Part 12, the CMF will benefit from the optimizations described herein.

FIG. 3 shows a portion of a table from ISO/IEC 14496 Part 12, in which some of the box types and relationships among box types are illustrated for the ISO Base Media File Format. The eighth column from the left includes references to sections of ISO/IEC 14496 Part 12, incorporated herein by reference above. The portion of the table shown is useful in illustrating benefits for at least some of the optimizations described herein; particularly those used in container formats based on or otherwise related to the ISO Base Media File Format. For example, the timescale for the presentation is defined in the Movie Header Box (mvhd 302). As discussed above, if the value for this parameter is chosen carefully (e.g., 30000 for a frame rate of 29.97 fps), then the sample duration may be a constant value (e.g., 1001 for a frame rate of 29.97 fps) for all of samples in the presentation. The result of this is that the sample duration may be specified higher in the file hierarchy, e.g., in the Track Header Box (tkhd 304). By contrast, if a timescale is selected that results in a non-uniform sample duration, the sample duration for each sample must be specified lower in the hierarchy, e.g., in the Sample Description Box (stsd 306). This, in turn, results in streaming overhead in which the sample duration is specified individually for each sample. In another example, for encoded content intended to be delivered at lower bit rates, e.g., for bit rates below 500 kpbs, sample size can be represented with a 2-byte field, e.g., in the Sample Size Box (stsz 308).

Figure 4:
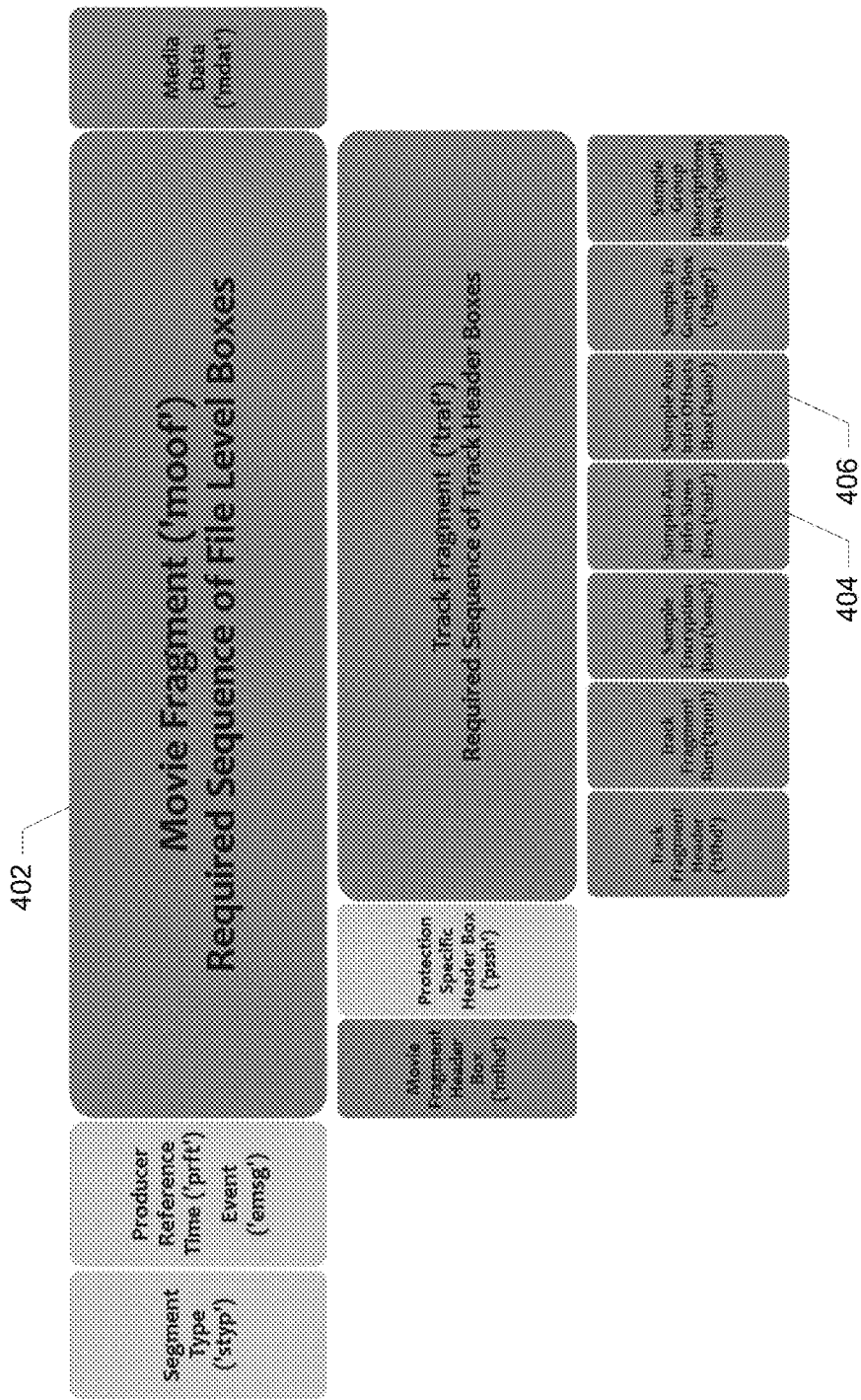
FIG. 4 a diagram illustrating a portion of the hierarchy of a Common Media Format file.

In a more specific example relating to the Common Media Format (CMF), FIG. 4 illustrates the box sequence and containment of a CMF Segment. A CMF Segment is a media object that is defined as a byte sequence equivalent to a segment from the ISO Base Media File format. The Movie Fragment box (moof 402) of a CMF file is similar to the Movie Fragment box (moof 310) of the ISO base format represented by the table of FIG. 3. For tracks protected using the Common Encryption (CENC) scheme, the values for the parameters aux_info_type and aux_info_type_parameter are intended to be specified in the Sample Auxiliary Information Offsets Box (saio 404) and the Sample Auxiliary Information Sizes Box (saiz 406). However, as discussed above, where the value for aux_info_type is 'cenc' and the value for aux_info_type_parameter is '0," these parameters can be specified once at the presentation level (e.g., in mvhd box 302 of FIG. 3) rather than at track, chunk, or sample level.

As will be appreciated by those of skill in the art with reference to the foregoing examples, different variants of the ISO base media format defined in ISO/IEC 14496 Part 12 (including, for example, MP4, QTFF, PIFF, CMM, CMF, etc.) have many analogous data structures, some of which may benefit from the same types of metadata optimizations as described in the present disclosure. It should be understood that these examples are representative, but not exhaustive. Other combinations of file formats and optimizations, as well as combinations of optimizations for a given file format are contemplated to be within the scope of this disclosure.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   encoding video content using a container format thereby generating first encoded video content, the first encoded video content including first image data and first metadata specifying a plurality of parameters for the first image data according to the container format, wherein encoding the video content to generate the first encoded content includes:
      for a first sample of the first encoded video content, identifying a plurality of subsample data ranges that are encrypted;
      consolidating the plurality of subsample data ranges of the first sample resulting in a consolidated subsample data range for the first sample; and
      for the first sample, specifying a first parameter of the first metadata, wherein the first parameter specifies the consolidated subsample data range as being encrypted;
   storing the first encoded video content for streaming to one or more client devices; and
   providing the first encoded video content to a first client device for playback of the first sample in accordance with the first parameter.

2. The method of claim 1, wherein a second parameter of the first metadata is specified to ensure a uniform value for a third parameter of the first metadata, and wherein the second parameter represents a time scale and the third parameter represents a sample duration.

3. The method of claim 2, wherein specifying the second parameter to ensure a uniform value for the third parameter includes selecting the second parameter using a frame rate associated with the first encoded video content represented as a ratio of integers.

4. The method of claim 1, wherein the container format specifies a standard metadata field size for a second parameter representing image resolution, wherein encoding the video content to generate the first encoded video content includes specifying the second parameter for the first image data using a reduced metadata field size having fewer bits than the standard metadata field size.

5. The method of claim 1, wherein a second parameter represents a field size for the first parameter, and wherein encoding the video content to generate the first encoded video content includes using a uniform value for the field size for the first parameter for a set of samples of a fragment by specifying the second parameter as the uniform value for the fragment.

6. The method of claim 1, wherein the container format specifies network abstraction layer metadata, and wherein encoding the video content to generate the first encoded video content includes omitting at least some of the network abstraction layer metadata from the first metadata.

7. The method of claim 1, wherein the container format specifies network abstraction layer metadata, and wherein encoding the video content to generate the first encoded video content includes omitting trailing zeroes for at least some network abstraction layer units (NALUs) of the network abstraction layer metadata of the first metadata.

8. The method of claim 1, wherein the container format specifies one or more optional metadata parameters, and wherein encoding the video content to generate the first encoded video content includes omitting at least some of the optional metadata parameters from the first metadata.

9. The method of claim 1, wherein consolidating the plurality of subsample data ranges of the first sample includes consolidating image data corresponding to the subsample data ranges of the first sample.

10. A system, comprising one or more data stores, and one or more computing devices configured to:
    encode video content using a container format thereby generating first encoded video content, the first encoded video content including first image data and first metadata specifying a plurality of parameters for the first image data according to the container format, wherein the one or more computing devices are configured to encode the video content to generate the first encoded content by:
       for a first sample of the first encoded video content, identifying a plurality of subsample data ranges that are encrypted;
       consolidating the plurality of subsample data ranges of the first sample resulting in a consolidated subsample data range for the first sample; and
       for the first sample, specifying a first parameter of the first metadata, wherein the first parameter specifies the consolidated subsample data range as being encrypted;
    store the first encoded video content in the one or more data stores; and
    provide the first encoded video content to one or more client devices for playback of the first sample in accordance with the first parameter.

11. The system of claim 10, wherein a second parameter of the first metadata is specified to ensure a uniform value for a third parameter of the first metadata, and wherein the second parameter represents a time scale and the third parameter represents a sample duration.

12. The system of claim 11, wherein the one or more computing devices are configured to specify the second parameter to ensure a uniform value for the third parameter by selecting the second parameter using a frame rate associated with the first encoded video content represented as a ratio of integers.

13. The system of claim 10, wherein the container format specifies a standard metadata field size for a second parameter representing image resolution, wherein the one or more computing devices are configured to encode the video content to generate the first encoded video content by specifying the second parameter for the first image data using a reduced metadata field size having fewer bits than the standard metadata field size.

14. The system of claim 10, wherein a second parameter represents a field size for the first parameter, and wherein the one or more computing devices are configured to encode the video content to generate the first encoded video content by using a uniform value for the field size for the first parameter for a set of samples of a fragment and specifying the second parameter as the uniform value for the fragment.

15. The system of claim 10, wherein the container format specifies network abstraction layer metadata, and wherein the one or more computing devices are configured to encode the video content to generate the first encoded video content by omitting at least some of the network abstraction layer metadata from the first metadata.

16. The system of claim 10, wherein the container format specifies network abstraction layer metadata, and wherein the one or more computing devices are configured to encode the video content to generate the first encoded video content by omitting trailing zeroes for at least some network abstraction layer units (NALUs) of the network abstraction layer metadata of the first metadata.

17. The system of claim 10, wherein the container format specifies one or more optional metadata parameters, and wherein the one or more computing devices are configured to encode the video content to generate the first encoded video content by omitting at least some of the optional metadata parameters from the first metadata.

18. The system of claim 10, wherein the one or more computing devices are configured to consolidate the plurality of subsample data ranges of the first sample by consolidating image data corresponding to the subsample data ranges of the first sample.

19. A computer program product, comprising one or more non-transitory computer-readable media having computer program instructions stored there, the computer program instructions being configured such that, when executed by one or more computing devices, the computer program instructions cause the one or more computing devices to:
   encode video content at a first quality level using a container format thereby generating first encoded video content, the first encoded video content including first image data and first metadata specifying a plurality of parameters for the first image data according to the container format, wherein the one or more computing devices are configured to encode the video content to generate the first encoded content by:
      for a first sample of the first encoded video content, identifying a plurality of subsample data ranges that are encrypted;
      consolidating the plurality of subsample data ranges of the first sample resulting in a consolidated subsample data range for the first sample; and
      for the first sample, specifying a first parameter of the first metadata, wherein the first parameter specifies the consolidated subsample data range as being encrypted;
   store the first encoded video content in one or more data stores; and
   provide the first encoded video content to a first client device for playback of the first sample in accordance with the first parameter.

* * * * *